United States Patent
Lees et al.

(10) Patent No.: US 10,239,395 B2
(45) Date of Patent: Mar. 26, 2019

(54) WATERPROOF TOP DOOR FOR TRAILER

(71) Applicant: Titan Trailers Inc., Delhi (CA)

(72) Inventors: Rick Lees, Burgessville (CA); Andrew Joseph Maertens, Delhi (CA); Michael Kloepfer, Delhi (CA)

(73) Assignee: Titan Trailers Inc., Delhi (CA)

( * ) Notice: Subject to any disclaimer, the term of this patent is extended or adjusted under 35 U.S.C. 154(b) by 0 days.

(21) Appl. No.: 15/558,728

(22) PCT Filed: Jun. 20, 2016

(86) PCT No.: PCT/CA2016/050719
§ 371 (c)(1),
(2) Date: Sep. 15, 2017

(87) PCT Pub. No.: WO2016/205930
PCT Pub. Date: Dec. 29, 2016

(65) Prior Publication Data
US 2018/0244138 A1     Aug. 30, 2018

Related U.S. Application Data

(60) Provisional application No. 62/183,419, filed on Jun. 23, 2015.

(51) Int. Cl.
*B60J 7/14* (2006.01)
*B60J 10/30* (2016.01)
(Continued)

(52) U.S. Cl.
CPC ............ *B60J 7/141* (2013.01); *B60J 7/1621* (2013.01); *B60J 10/30* (2016.02); *B60J 10/82* (2016.02);
(Continued)

(58) Field of Classification Search
CPC . B60J 7/141; B60J 10/90; B60J 7/1621; B60J 10/30; B60J 10/82; B60P 7/02; B62D 63/08
(Continued)

(56) References Cited

U.S. PATENT DOCUMENTS 3,186,756 A * 6/1965 Barker .................... B60J 7/041
                                                              16/363
4,302,044 A * 11/1981 Sims ...................... B60J 7/141
                                                             105/378

(Continued)

FOREIGN PATENT DOCUMENTS

| CA | 1225685 A | 8/1987 |
| CA | 2675058 A1 | 2/2010 |
| WO | WO-0035710 A1 | 6/2000 |

OTHER PUBLICATIONS

European Patent Application No. 16813425.2, Extended European Search Report dated Jun. 18, 2018.
(Continued)

*Primary Examiner* — Gregory A Blankenship
(74) *Attorney, Agent, or Firm* — Borden Ladner Gervais LLP

(57) ABSTRACT

A trailer has a container with top doors having a frame and weatherproof thermoplastic inserts. Sealing flaps are provided at edges of the top doors to make sealing contact with sidewall top rails or top edges of end walls and tailgate. The top doors have angled extensions with grooves for ball gaskets to overlap in hand-in-hand fashion to form a reliable seal where the top doors come together. The system provides a weatherproof means to enclose the container to prevent or deter entry of water.

22 Claims, 8 Drawing Sheets

(51) Int. Cl.
  *B60J 10/82*  (2016.01)
  *B60J 10/90*  (2016.01)
  *B60P 7/02*  (2006.01)
  *B62D 63/08*  (2006.01)
  *B60J 7/16*  (2006.01)

(52) U.S. Cl.
  CPC .............. *B60J 10/90* (2016.02); *B62D 63/08* (2013.01); *B60P 7/02* (2013.01)

(58) Field of Classification Search
  USPC .............................. 296/183.1, 185.1, 100.06
  See application file for complete search history.

(56) References Cited

U.S. PATENT DOCUMENTS

| | | | | |
|---|---|---|---|---|
| 4,627,658 A | * | 12/1986 | Vold | B60J 7/1621 |
| | | | | 105/377.03 |
| 4,767,152 A | * | 8/1988 | Stluka | B60J 7/141 |
| | | | | 296/100.1 |
| 5,087,093 A | * | 2/1992 | Repetti | B60J 7/141 |
| | | | | 296/100.09 |
| 6,152,511 A | * | 11/2000 | Gustafson | B60P 3/41 |
| | | | | 296/14 |
| 6,254,169 B1 | * | 7/2001 | Arthur | B60J 7/1621 |
| | | | | 296/100.04 |
| 7,419,207 B2 | * | 9/2008 | Klein | B60J 7/1621 |
| | | | | 296/100.06 |
| 7,967,357 B2 | * | 6/2011 | Kloepfer | B60P 3/42 |
| | | | | 105/377.05 |
| 8,342,589 B2 | | 1/2013 | Kloepfer | |
| 2011/0309590 A1 | * | 12/2011 | Kloepfer | B60P 3/42 |
| | | | | 280/30 |
| 2018/0050739 A1 | * | 2/2018 | Maertens | E05F 15/63 |

OTHER PUBLICATIONS

International Patent Application No. PCT/CA2016/050719, International Preliminary Report on Patentability dated May 19, 2017.
International Patent Application No. PCT/CA2016/050719, International Search Report and Written Opinion dated Aug. 31, 2016.

* cited by examiner

WATERPROOF TOP DOOR FOR TRAILER

FIELD

The present disclosure relates generally to top-loadable cargo trailers.

BACKGROUND

Trailers are widely used to transport various materials. For example, tipper trailers and walking floor trailers are widely used to transport particulate bulk material such as gravel, stone, grain, and road salt. Dump trailers are also used for transporting such material, as well as other material such as garbage.

Some trailers have a top opening for loading of materials into the trailer. Such trailers may loaded from through a top opening of the trailer using a loader or directly from a feed source such as an overhead chute. A tarp or other sheet covering is commonly used to cover the top opening of the trailer while the trailer is towed to its destination. Tie-downs such as bungees, ropes, or straps are commonly used to tie down the tarp to secure it in place while the trailer is in motion.

Some common problems with the use of tarps in this way is that they are subject to damage by puncturing or otherwise by contact with the contents of the trailer, they may become loose and shift out of a desired covering position, and they are cumbersome and time-consuming to mount and unmount from the trailer.

Alternatively, a trailer may be provided with one or more top doors which may be closed to protect the loaded material from contamination or from being disturbed or blown about or out of the trailer during transport. Each top door is typically mounted to the container along an adjoining upper edge of a sidewall of the container by means of a number of hinges.

When a trailer is provided with top doors, however, it is desirable for the top doors to be weatherproof such that the top doors are resilient to varying weather conditions, and moreover prevent water from entering the trailer container.

In general, it is desirable for trailers to have a construction and to be made of materials which are both durable and as light as possible to provide both longevity against rough handling as well as optimal fuel economy. Given the tight turnaround times typically faced in cargo hauling using trailers, it is desirable to be able to repair any damage as quickly as possible.

There is therefore a material value in addressing the above deficiencies of conventional open-top trailers and tarp tie-down methods.

BRIEF DESCRIPTION OF THE DRAWINGS

Embodiments will now be described, by way of example only, with reference to the attached Figures.

DESCRIPTION

An open-top trailer with weatherproof top doors is shown in FIGS. 1-7.

The open-top trailer has one or more top doors openable to expose a top opening of a container of the trailer to enable loading or unloading of bulk materials from the container, and closeable to conceal and protect the bulk material from weather and contaminants.

In one embodiment, the trailer is similar to a trailer as disclosed in World Intellectual Property Organization International Application No. PCT/CA2015/050439 ("the PCT Application"), the entirety of which is incorporated herein by reference.

In the present description, the relative terms inner, outer, upper, and lower, and related or derivative terms such as inward, outward, upward, and downward, or inside, outside, above, and below, respectively, are defined relative to a trailer in its usual, upright orientation, as follows. The trailer is characterized by a longitude being its longest dimension and the general rolling direction of the wheels of its wheeled suspension, and a transverse being the horizontal dimension orthogonal to the longitude. The term inner and its derivatives means at, about, toward, or relatively proximate a transverse center of the trailer. The term outer and its derivatives means at, about, toward, or relatively proximate a transverse extremity at a sidewall of the container of the trailer. The term upper and its derivatives means at, about, toward, or relatively proximate a vertical top of the trailer. The term lower and its derivatives means at, about, toward, or relatively proximate a vertical bottom of the trailer.

Figure 1:
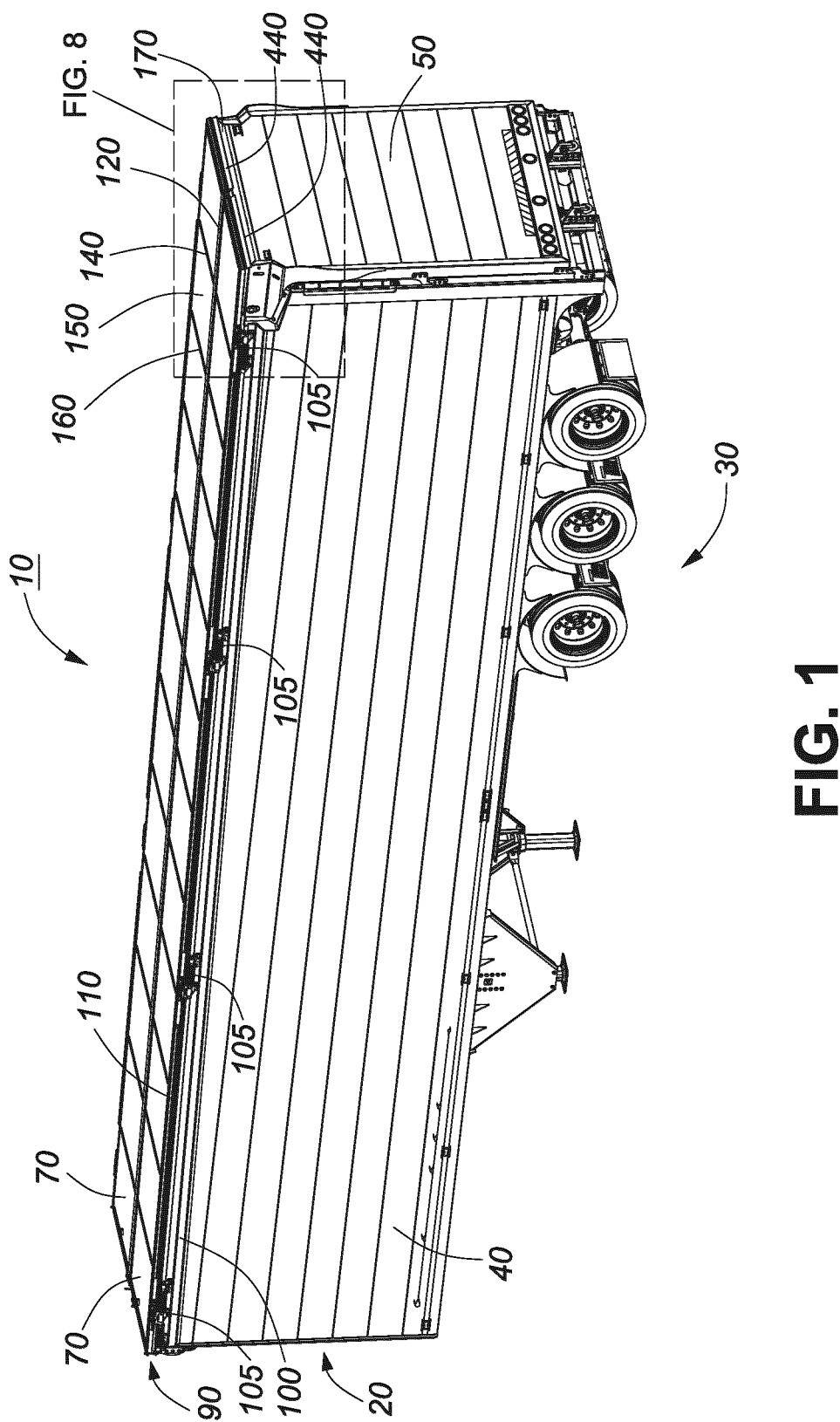
FIG. 1 is rear perspective view of a trailer in one embodiment of the disclosed inventions.
Figure 2:
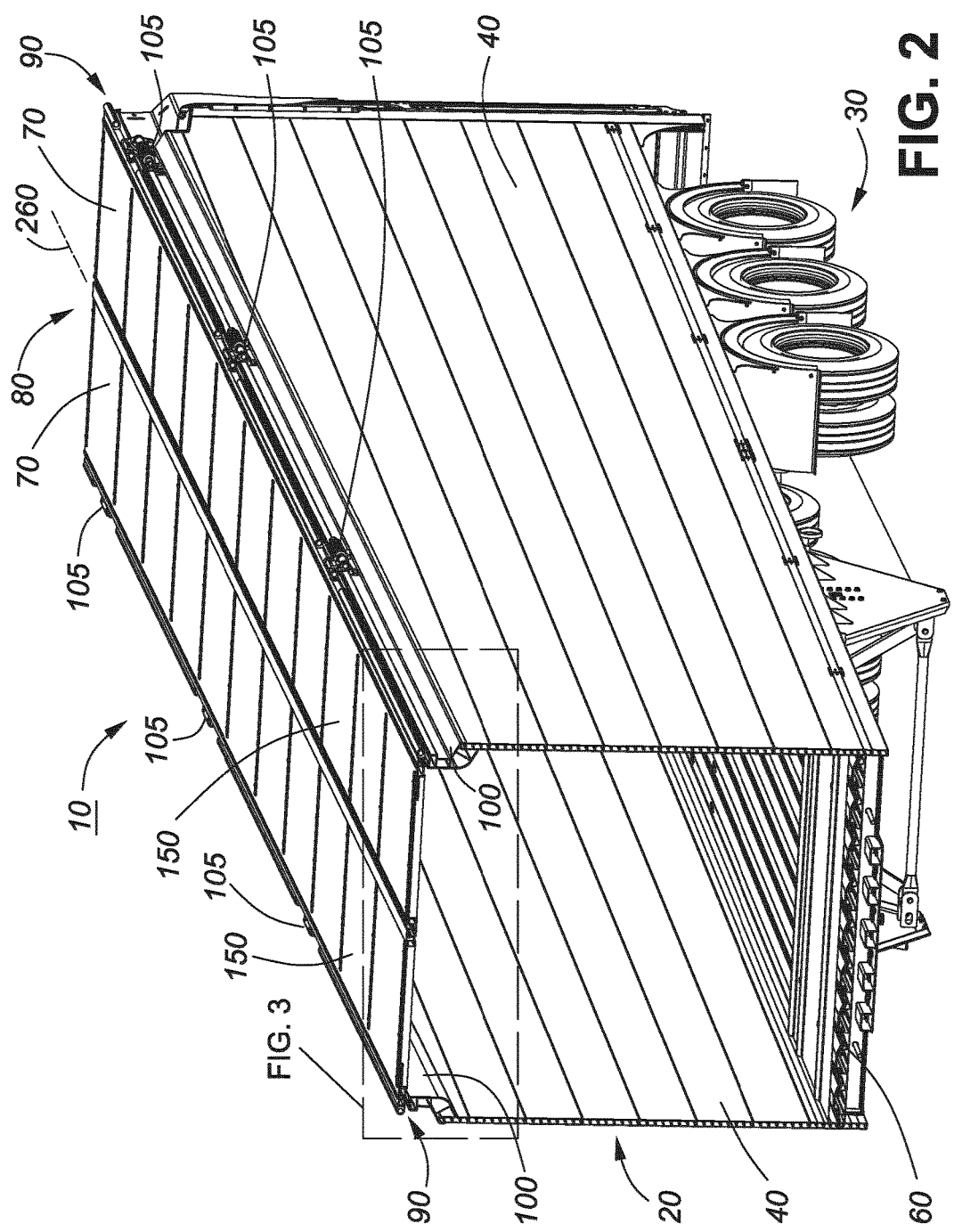
FIG. 2 is a front perspective cross-sectional view of the trailer of FIG. 1.
Figure 3:
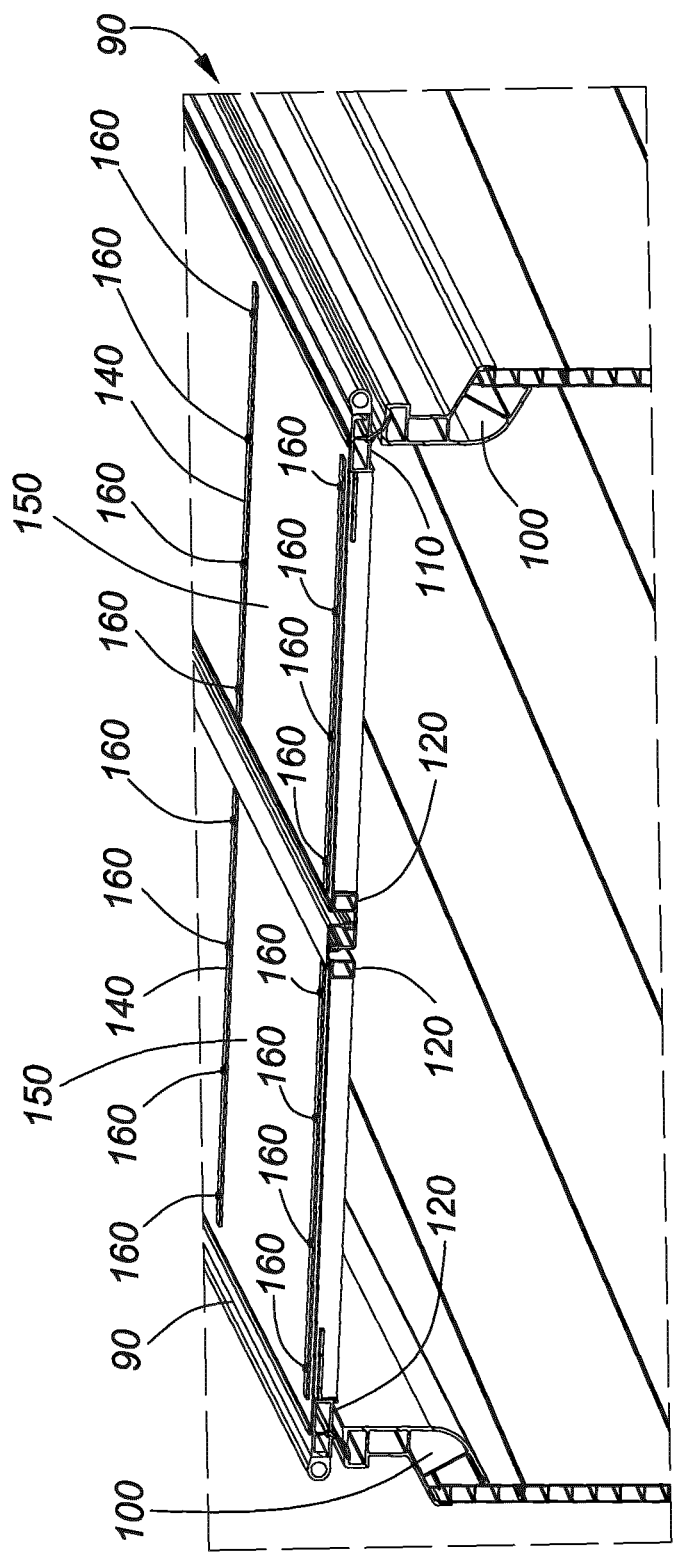
FIG. 3 is an enlarged perspective cross-sectional view of the trailer of FIG. 2.
Figure 4:
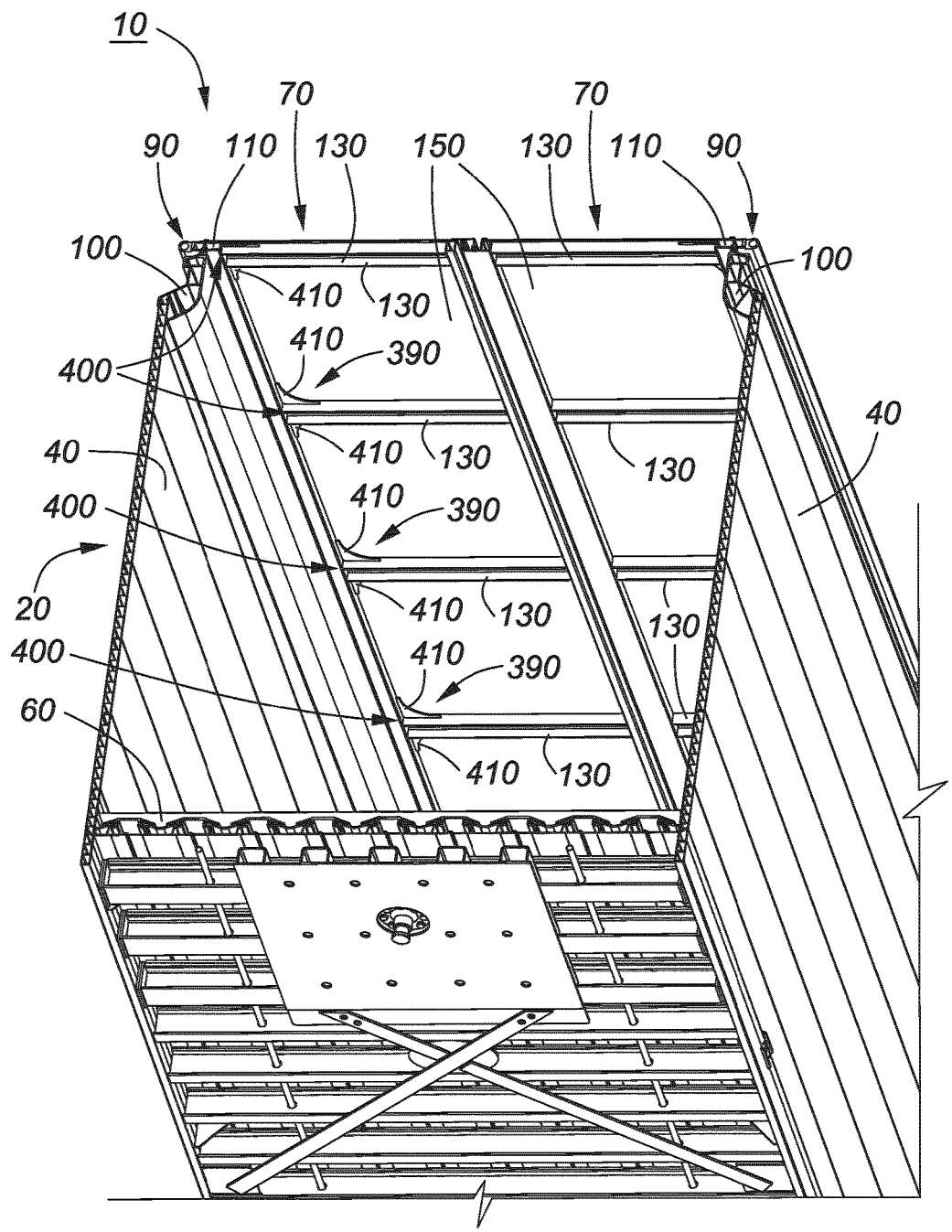
FIG. 4 is a bottom perspective cross-sectional view of the trailer of FIG.
Figure 5:
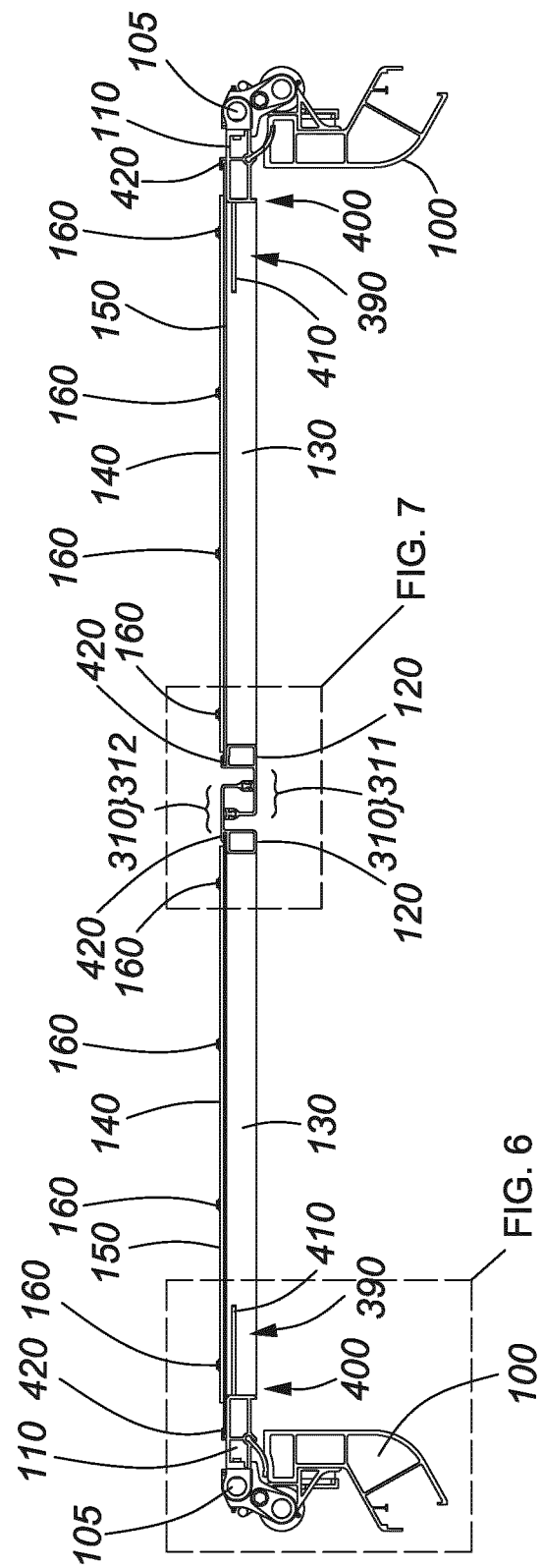
FIG. 5 is an end cross-sectional exploded view of the sidewall upper rails, hinges, and top doors of the trailer of FIG. 1.
Figure 6:
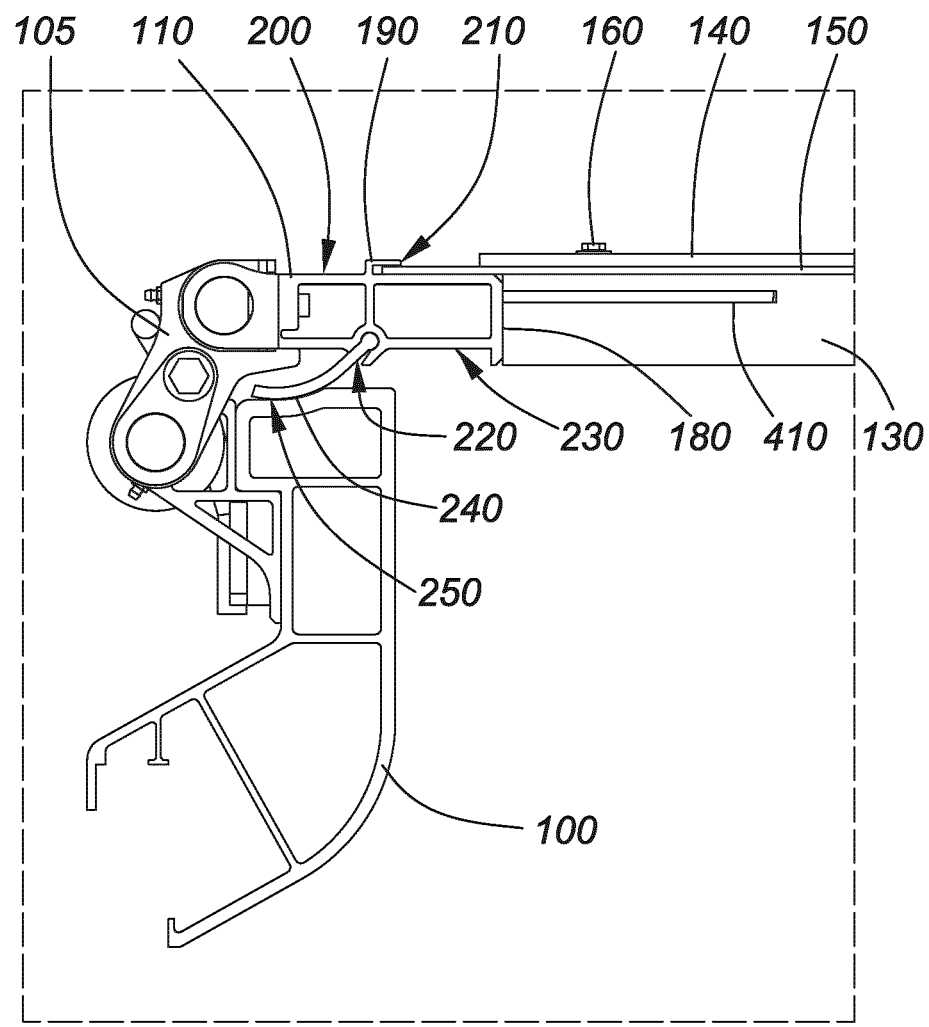
FIG. 6 is an enlargement of a portion of the view of FIG. 5 showing the sidewall upper rail, hinge, and portion of the top door showing the outer door rail.
Figure 7:
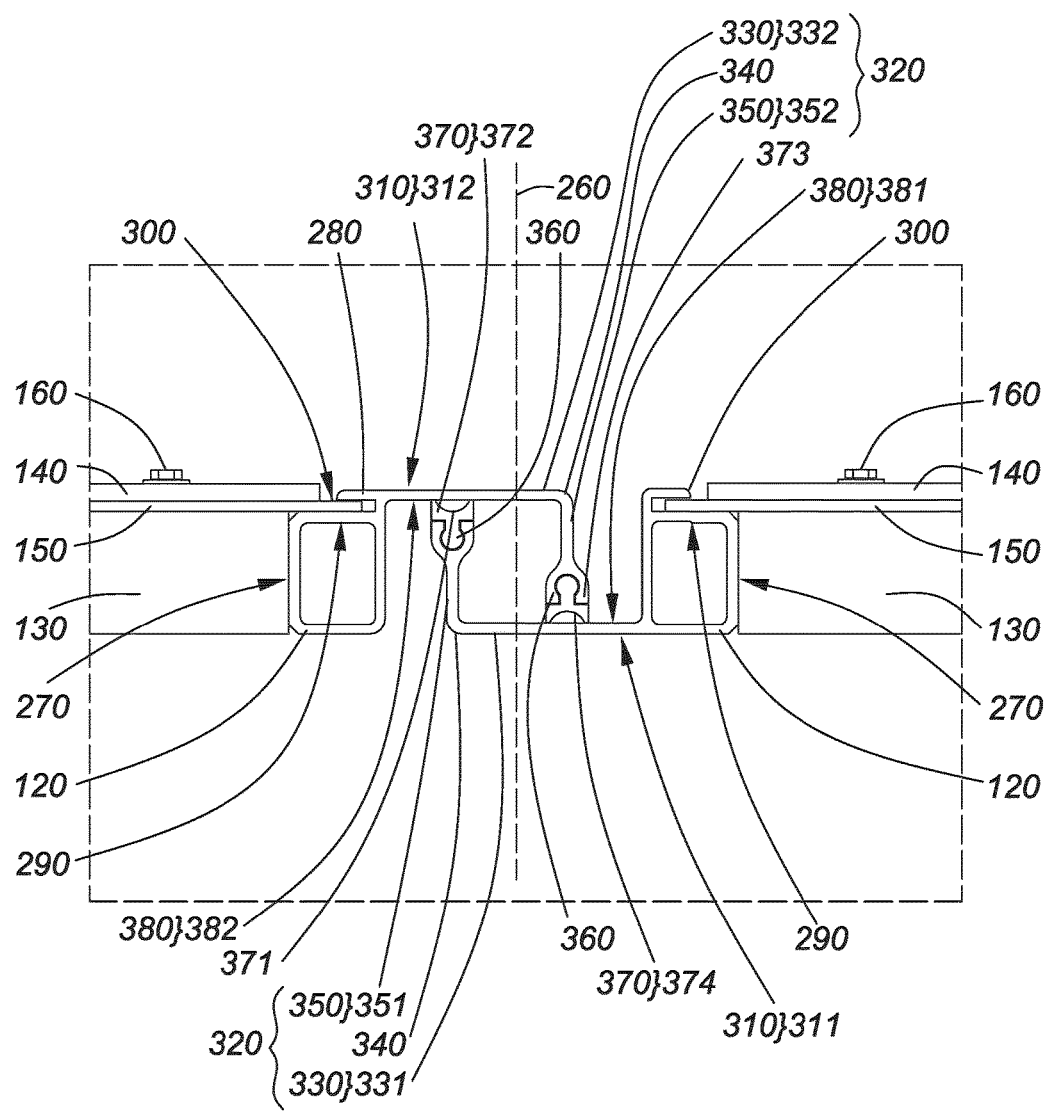
FIG. 7 is an enlargement of a portion of the view of FIG. 5 showing the inner door rails of the top doors of the trailer.

With reference to FIGS. 1 & 2, a trailer 10 has a container 20 supported by a wheeled suspension 30. The container 20 has two opposing sidewalls 40 and two top doors 70 for selectively closing a top opening 80 of the container 20. The container 20 may further have a front wall (not shown), an end wall 50, and a floor 60. The floor 60 may be a walking floor, or another other suitable type of trailer floor including a bare floor. Each top door 70 is hingedly mounted at an outer edge 90 of the top door 70, which may be at an upper rail 100 of a corresponding sidewall 40. Each top door 70 may be mounted using any suitable hinged mounts 105 which may include the double, or compound hinge assemblies, described in the PCT Application. The top doors 70 may be similarly automatically opened and closed using a top door opening mechanism as disclosed therein. The top doors 70 may be formed of any desired material. In one embodiment, the top doors 70 are formed of sheet aluminum. In general, the top doors 70 disclosed herein may be used in place of the top doors disclosed in the PCT Application, but otherwise the remainder of the teachings of the PCT Application may be applied.

In some embodiments, best shown in FIGS. 3-7, each top door 70 may have an outer door rail 110, an inner door rail 120, a plurality of lower cross struts 130 (shown best in FIG. 4), a plurality of upper cross struts 140 (shown best in FIGS. 2 & 3), at least one door panel 150, door panel fasteners 160, and an end rail 170.

The outer door rail 110 may extend along a length of the top door 70 at the outer edge 90 of the top door 70. The outer door rail 110 may have an inward face 180 (best seen in FIG. 6), a retaining lip 190 at an upward face 200 defining an inward slot 210, and a lower slot 220 at a downward face 230. The lower slot 220 may slidingly receive a sidewall seal, such as a sidewall flap 240, for sealingly contacting an opposing upper surface of the corresponding sidewall 40, such as an outwardly-sloping upper surface 250 of the upper rail 100 when the top door 70 is closed. Such sealing contact may prevent entry of water into the container 20, and moreover the outwardly-sloping upper surface 250 may urge any water or moisture to flow downward and out of the container. The sidewall flaps 240 may be particularly suitable where the top door 70 is configured to open 270°, as when the compound hinge assemblies taught in the PCT Application are used, as they repeatedly move and form a seal at the top rail when the top door is opened and closed.

The inner door rail 120 may extend along the length of the top door 70 substantially parallel to the outer door rail 110 and proximate to a transverse center 260 of the container 20. The inner door rail 120 may have an outward face 270 (best seen in FIG. 7), and a retaining lip 280 at an upward face 290 of the inner door rail 120 defining an outward slot 300. The inner door rail 120 may have a closure bracket 310 comprising an arm 320 comprising an inwardly projecting upper arm 330 ending at an elbow 340 and a forearm 350 projecting vertically from the elbow 340. The closure bracket 310 may support an inner seal mounted in an inner seal slot, which may be include the forearm 350 ending in a gasket slot 360 slidingly to receive a gasket 370, which may be any suitable seal including a ball seal. When the top doors 70 are closed, the gasket 370 of the closure bracket 310 may sealingly contact an opposing surface 380 of the closure bracket 310 of the other top door 70, which may be an opposing surface 380 of the upper arm 330 of the closure bracket 310 of the other top door 70. For example, the forearm 351 of a first top door 71 may project upwardly, a sealing surface 371 of the inner seal or gasket 372 of the first top door 71 may face upwardly, and the opposing surface 382 of the upper arm 332 of the closure bracket 312 of the second top door 72 may face downwardly sealingly to contact the sealing surface 371 of the gasket 372 when the top doors 70 are closed. Similarly, the forearm 352 of the second top door 72 may project downwardly, a sealing surface 373 of the inner seal or gasket 374 of the second top door 72 may face downwardly, and the opposing surface 381 of the upper arm 331 of the closure bracket 311 of the first top door 71 may face upwardly sealingly to contact the sealing surface 373 of the gasket 374 when the top doors 70 are closed. When the top doors 70 are closed, the respective closure brackets 310 of the top doors 70 may be engaged in a hand-in-hand arrangement, and thus form a double seal. In some embodiments, additional plastic material, such as thermoplastic or thermoplastic composites as noted above, or flexible and curable sealant, may be used to provide a seal at or along the grooves.

The upper cross struts 140 and the lower cross struts 130 may transversely bridge the inner door rail 120 and the outer door rail 110. Each lower cross strut 130 may be affixed at respective opposite ends 390 of the lower cross strut 130, which may be by fasteners, which may be welds, at joints 400 with the inward face 180 of the outer door rail 110 and the outward face 270 of the inner door rail 120. The joint 400 with the outer door rail 110 may include flanges 410.

The outer door rails 110, inner door rails 120, lower cross struts 130, and upper cross struts 140 may be formed of any suitable materials, which in some embodiments includes aluminum, which may be extruded aluminum.

The door panel 150 may be sandwiched between the lower cross struts 130 and upper cross struts 140. Respective opposite edges 420 of the door panel 150 (shown in FIG. 5) may be slidingly received in the inward slot 210 of the outer door rail 110 (shown best in FIG. 6) and the outward slot 300 of the inner door rail 120 (shown best in FIG. 7). The door panel 150 may have sufficient flexibility and rigidity that it may be bowed slightly and inserted at the opposite edges 420 in the inward slot 210 and outward slot 300. When released, the door panel 150 may cease to bow, or bow less, and flatten, at least partially, such that the opposite edges 420 slide into the inward slot 210 and outward slot 300. Clamping means, such as fasteners 160, which may be screws or bolts, may be provided and extend through corresponding openings in the upper cross struts 140 and the door panel 150 to the lower cross struts 130 to clamp the door panel 150 between the upper cross struts 140 and lower cross struts 130. Doing so may cause the door panel 150 to flatten further, causing a lateral dimension to increase, and for contact to be made at the opposite edges 420 of the door panel 150 to respective opposing surfaces of the inward slot 210 and outward slot 300. Pressure between these opposing surfaces and the opposite edges 420 of the door panel 150 may be sufficient to form a seal. Alternatively, sealing means may be sandwiched between these surfaces, such as a gasket or sealant of any suitable material. The upper cross struts 140 have a length sufficient to bridge the outer door rail 110 and the inner door rail 120, and further to overlap the upward face 200 of the outer door rail 110 inside of the of the retaining lip 190 and the upward face 290 of the inner door rail 120 outside of the retaining lip 280, and include openings to receive fasteners to fasten the upper cross struts 140 to the outer door rail 110 and inner door rail 120. The fasteners 160 and upper cross struts 140 may be removable to remove and replace the door panel 150. The upper cross struts 140 may be hingedly mounted to one or the other of the outer door rail 110 or the inner door rail 120 rails to facilitate unfastening and removal of the door panel 150. Alternatively, the upper cross struts may be affixed to the outer door rail 110 and inner door rail 120, which may be by welding.

In some embodiments, the top doors 70 each comprise multiple door panels 150 sized and dimension together to span the top doors 70. The door panels 150 may be formed of any desired material. In some embodiments, the door panels 150 are formed of plastic material, which may be thermoplastic material, which may be thermoplastic composite, which may be polypropylene resin reinforced with continuous woven glass fibers, which may be Bulitex™ available from US Liner Company of 19 Leonberg Road, Cranberry Township, Pa., 16066, United States of America.

Figure 8:
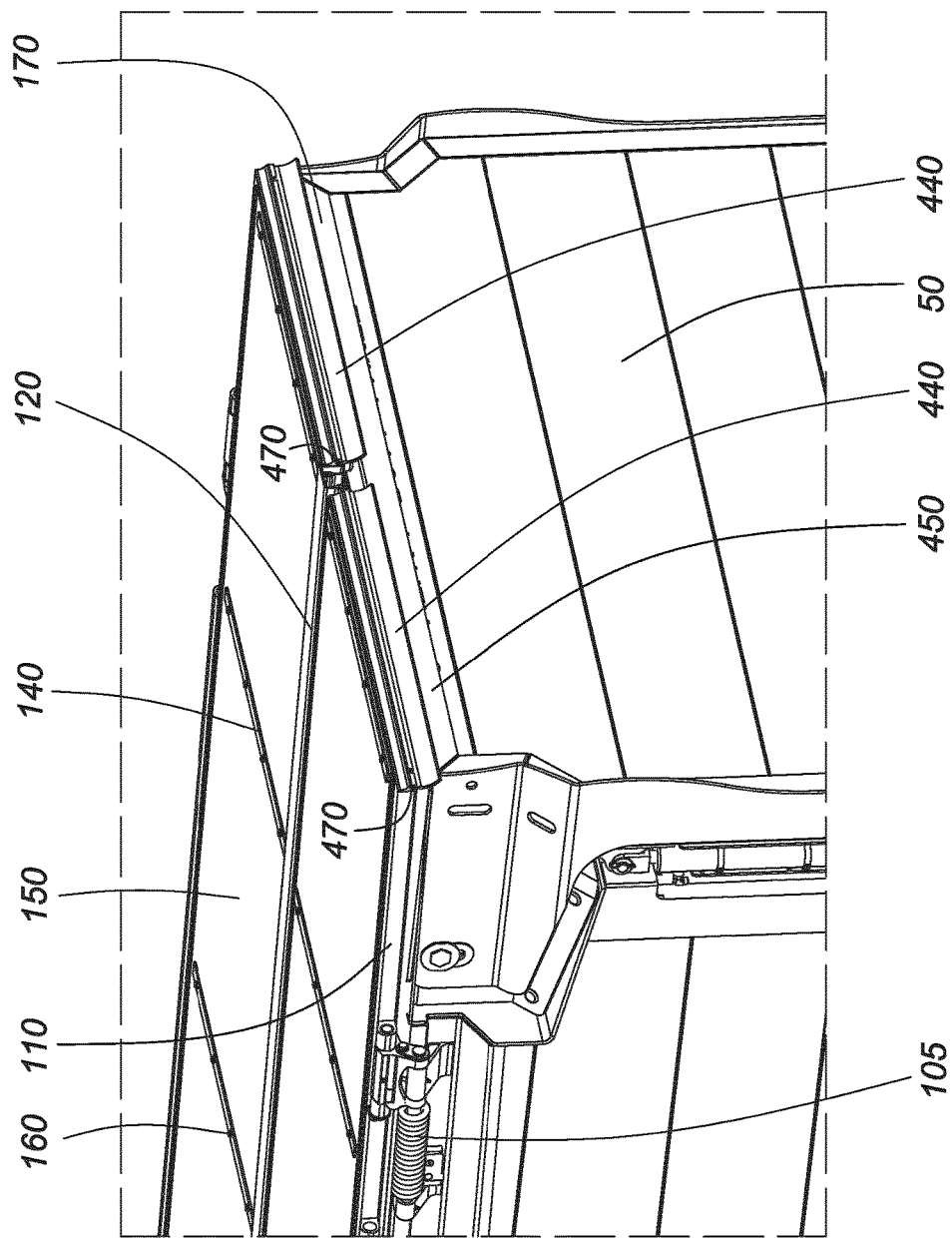
FIG. 8 is an enlargement of a portion of the view of FIG. 1 showing an end wall flap of the trailer.

As shown in FIGS. 1 & 8, the container 20 may further have an end rail 170, which may be disposed at an upper edge of the end wall 50, and transversely bridging the inner door rail 120 and the outer door rail 110 adjacent the end wall 50. The end rail 170 may have a lower slot 470 slidingly to receive an end wall seal, which may be an end wall flap 440, for sealingly contacting an opposing upward surface of the end wall 50, which may be a rearwardly-sloping upward surface 450 of the end wall 50, when the top door 70 is closed. Such sealing contact may prevent entry of water into the container 20, and moreover the rearwardly-sloping upward surface 450 may urge any water or moisture to flow downward and out of the container.

The components of the trailer 10 may be formed of any suitable materials using any suitable constructions. In particular, the sidewalls 40 of the container 20 may be formed of extruded aluminum panels.

The container sidewalls and top rail may be formed of any suitable material and construction, and in some embodiments comprises extruded aluminum panels. The top door frame may be formed of any suitable material and construction, and in some embodiments comprises extruded aluminum bars.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A trailer comprising a container supported by a wheeled suspension, the container comprising two opposing sidewalls, a front wall, an end wall, a floor, and two top doors for selectively closing a top opening of the container, each top door being hingedly mounted at an outer edge of the top door at an upper rail of a corresponding sidewall, each top door comprising:

an outer door rail extending along a length of the top door at the outer edge of the top door, the outer door rail comprising an inward face, a retaining lip at an upward face of the outer door rail defining an inward slot, and a lower slot at a downward face of the outer door rail slidingly to receive a sidewall flap for sealingly contacting an opposing outwardly-sloping upper surface of the upper rail of the corresponding sidewall when the top door is closed;

an inner door rail extending along the length of the top door substantially parallel to the outer door rail and proximate to a transverse center of the container, the inner door rail comprising an outward face, a retaining lip at an upward face of the inner door rail defining an outward slot, and a closure bracket comprising an arm comprising an inwardly projecting upper arm ending at an elbow and a forearm projecting vertically from the elbow and ending in a gasket slot slidingly to receive a gasket, wherein, when the top doors are closed, the gasket of the closure bracket sealingly contacts an opposing surface of the upper arm of the closure bracket of the other top door;

a plurality of lower cross struts transversely bridging the inner door rail and the outer door rail, each lower cross strut being affixed at respective opposite ends of the lower cross strut at joints with the inward face of the outer door rail and the outward face of the inner door rail, wherein the joint with the outer door rail comprises flanges;

a plurality of upper cross struts transversely bridging the inner door rail and outer door rail;

a door panel sandwiched between the lower cross struts and upper cross struts, wherein respective opposite edges of the door panel are slidingly received in the inward slot of the outer door rail and the outward slot of the inner door rail;

fasteners extending through openings in the upper cross struts and the door panel to the lower cross struts to clamp the door panel between the upper cross struts and lower cross struts, wherein the fasteners and upper cross struts are removable to remove and replace the door panel; and an end rail transversely bridging the inner door rail and the outer door rail adjacent the end wall, the end rail comprising a lower slot slidingly to receive an end wall flap for sealingly contacting an opposing rearwardly-sloping upward surface of the end wall when the top door is closed.

2. A trailer comprising a container supported by a wheeled suspension, the container comprising two opposing sidewalls and two top doors for selectively closing a top opening of the container, each top door being hingedly mounted at an outer edge of the top door at a corresponding sidewall, each top door comprising:

an inner door rail extending along a length of the top door proximate to a transverse center of the container, the inner door rail comprising a closure bracket supporting an inner seal, wherein, when the top doors are closed, the inner seal sealingly contacts an opposing surface of the closure bracket of the other top door, wherein the closure bracket comprises an arm comprising an inwardly projecting upper arm ending at an elbow and a forearm projecting vertically from the elbow and ending in an inner seal slot, wherein the inner seal is mounted in the inner seal slot.

3. The trailer according to claim 2, wherein, for each top door, the opposing surface of the closure bracket of the other top door comprises an opposing surface of the upper arm of the other top door.

4. The trailer according to claim 3, wherein the top doors comprise a first top door and a second top door, and wherein:

the forearm of the first top door projects upwardly, a sealing surface of the inner seal of the first top door faces upwardly, and the opposing surface of the upper arm of the closure bracket of the second top door faces downwardly; and the forearm of the second top door projects downwardly, a sealing surface of the inner seal of the second top door faces downwardly, and the opposing surface of the upper arm of the closure bracket of the first top door faces upwardly.

5. The trailer according to claim 4, wherein, when the top doors are closed, the respective closure brackets of the top doors are engaged in a hand-in-hand arrangement.

6. The trailer according to claim 5, wherein, for each top door, the inner seal comprises a gasket.

7. The trailer according to claim 2, wherein each top door further comprises:

an outer door rail extending along the length of the top door substantially parallel to the inner door rail and at the outer edge of the top door, the outer door rail comprising a sidewall seal for sealingly contacting an opposing upper surface of the corresponding sidewall when the top door is closed.

8. The trailer according to claim 7, wherein for each top door, the outer door rail further comprises a lower slot at a downward face of the outer door rail, wherein the sidewall seal is mounted at the lower slot.

9. The trailer according to claim 8, wherein, for each top door, the lower slot slidingly receives the sidewall seal.

10. The trailer according to claim 9, wherein, for each top door, the sidewall seal comprises a sidewall flap.

11. A trailer comprising a container supported by a wheeled suspension, the container comprising two opposing sidewalls and two top doors for selectively closing a top opening of the container, each top door being hingedly mounted at an outer edge of the top door at a corresponding sidewall, each top door comprising:
- an inner door rail extending along a length of the top door proximate to a transverse center of the container, the inner door rail comprising a closure bracket supporting an inner seal, wherein, when the top doors are closed, the inner seal sealingly contacts an opposing surface of the closure bracket of the other top door;
- an outer door rail extending along the length of the top door substantially parallel to the inner door rail and at the outer edge of the top door, the outer door rail comprising a sidewall seal for sealingly contacting an opposing upper surface of the corresponding sidewall when the top door is closed, the outer door rail further comprising a lower slot at a downward face of the outer door rail, wherein the sidewall seal is mounted at the lower slot, wherein the lower slot slidingly receives the sidewall seal, wherein the sidewall seal comprises a sidewall flap,
- wherein, for each top door, the corresponding sidewall comprises an upper rail,
- wherein the opposing upper surface of the corresponding sidewall comprises an opposing outwardly-sloping upper surface of the upper rail.

12. A trailer comprising a container supported by a wheeled suspension, the container comprising two opposing sidewalls and two top doors for selectively closing a top opening of the container, each top door being hingedly mounted at an outer edge of the top door at a corresponding sidewall, each top door comprising:
- an inner door rail extending along a length of the top door proximate to a transverse center of the container, the inner door rail comprising a closure bracket supporting an inner seal, wherein, when the top doors are closed, the inner seal sealingly contacts an opposing surface of the closure bracket of the other top door;
- an outer door rail extending along the length of the top door substantially parallel to the inner door rail and at the outer edge of the top door, the outer door rail comprising a sidewall seal for sealingly contacting an opposing upper surface of the corresponding sidewall when the top door is closed;
- a plurality of lower cross struts transversely bridging the inner door rail and the outer door rail;
- a plurality of upper cross struts transversely bridging the inner door rail and outer door rail;
- a door panel sandwiched between the lower cross struts and upper cross struts; and
- clamping means to clamp the door panel between the upper cross struts and lower cross struts.

13. The trailer according to claim 12, wherein each lower cross strut is affixed at respective opposite ends of the lower cross strut at joints with the outer door rail and inner door rail.

14. The trailer according to claim 13, wherein each lower cross strut is affixed at the respective opposite ends of the lower cross strut at the joints with an inward face of the outer door rail and an outward face of the inner door rail.

15. The trailer according to claim 14, wherein, for each lower cross strut, the joint with the outer door rail comprises flanges.

16. The trailer according to claim 12, wherein the outer door rail comprises an inward face and a retaining lip at an upward face of the outer door rail defining an inward slot, the inner door rail comprises an outward face and a retaining lip at an upward face of the inner door rail defining an outward slot, and respective opposite edges of the door panel are received in the inward slot of the outer door rail and the outward slot of the inner door rail.

17. The trailer according to claim 16, wherein the respective opposite edges of the door panel are slidingly received in the inward slot of the outer door rail and the outward slot of the inner door rail.

18. The trailer according to claim 12, wherein the clamping means comprise fasteners extending through openings in the upper cross struts and the door panel to the lower cross struts to clamp the door panel between the upper cross struts and lower cross struts.

19. The trailer according to claim 18, wherein the fasteners and upper cross struts are removable to remove and replace the door panel.

20. The trailer according to claim 12 further comprising an end wall an end rail transversely bridging the inner door rail and the outer door rail adjacent the end wall, the end rail comprising a lower slot to receive an end wall seal for sealingly contacting an opposing upward surface of the end wall when the top door is closed.

21. The trailer according to claim 20, wherein the lower slot slidingly receives the end wall seal.

22. The trailer according to claim 21, wherein opposing upward surface of the end wall is an opposing rearwardly-sloping upward surface of the end wall.

* * * * *